United States Patent [19]
Aiyer

[11] Patent Number: 5,648,848
[45] Date of Patent: Jul. 15, 1997

[54] BEAM DELIVERY APPARATUS AND METHOD FOR INTERFEROMETRY USING ROTATABLE POLARIZATION CHUCKS

[75] Inventor: Arun A. Aiyer, Fremont, Calif.

[73] Assignee: Nikon Precision, Inc., Belmont, Calif.

[21] Appl. No.: 381,734

[22] Filed: Feb. 1, 1995

[51] Int. Cl.$^6$ ................................................. B01B 9/02
[52] U.S. Cl. ....................... 356/351; 356/345; 356/363
[58] Field of Search ................................. 356/358, 351, 356/345, 363, 349

[56]  References Cited

U.S. PATENT DOCUMENTS

| 4,726,657 | 2/1988 | Perkins et al. | 356/321 |
| 4,824,251 | 4/1989 | Slotwinski et al. | |
| 4,950,078 | 8/1990 | Sommargren. | |
| 5,106,191 | 4/1992 | Ohtsuka | 356/358 |
| 5,206,924 | 4/1993 | Kersey. | |
| 5,225,887 | 7/1993 | Lipson et al. | 356/345 |

FOREIGN PATENT DOCUMENTS 61-219803  9/1986  Japan.

OTHER PUBLICATIONS

HP Journal, Apr. 1983, "A new Microcomputer–Controlled Laser Dimensional Measurement and Analysis System," pp. 3–13.

Butterworth & Co., Jan. 1990, vol. 12, No. 1, "Sub–micron Position Measurement and Control on Precision Machine Tools With Laser Interferometery".

*Primary Examiner*—Samuel A. Turner
*Assistant Examiner*—Robert Kim
*Attorney, Agent, or Firm*—Bennet K. Langlotz

[57]  ABSTRACT

A method of providing a beam having precisely orthogonally polarized components includes generating a beam with substantially orthogonally polarized components, splitting the beam to separate the components to separate paths, projecting each component into a respective polarization preserving optical fiber (PPF) or polarizing fiber, recombining the components output from the fibers into a single beam, and transmitting the single beam to an interferometer. The PPFs are rotationally adjustable at their output ends to provide precise orthogonality in the resulting beam.

18 Claims, 3 Drawing Sheets

BEAM DELIVERY APPARATUS AND METHOD FOR INTERFEROMETRY USING ROTATABLE POLARIZATION CHUCKS

FIELD OF THE INVENTION

This invention relates to interferometers, and more particularly to optical apparatus and methods for delivering a beam to an interferometer.

BACKGROUND AND SUMMARY OF THE INVENTION

Interferometers are optical instruments used for precisely measuring displacements by reflecting a laser beam off a target and analyzing the optical characteristics of the returning beam. In a commonly used heterodyne interferometer, a laser beam having orthogonally polarized components of different frequencies is used. After splitting the components with a polarizing beam splitter, one component is reflected off the movable target and the other is reflected off a fixed reference. The components are recombined and the resulting beat frequency is analyzed. Because each component carries a distinct signal, it is important to avoid "crosstalk" between the orthogonally polarized components.

In such conventional interferometers, some crosstalk occurs because the beam components are not precisely orthogonal to each other. Typical nonorthogonality values may range up to several degrees. This generates nonlinearity errors that skew measurement results. Such errors have been small enough to be acceptable in many applications, but are problematic in critical applications such as microlithography.

Existing systems use additional optics and receiver electronics to reduce the nonorthogonality typical of most systems, but these systems are often bulky and of limited effect. Because of the thermal and turbulence effects that reduce measurement precision, existing beam sources may be positioned outside the target environment, but this requires an optically precise window, which ay generate errors. This also adds to the machine footprint.

The present invention overcomes the limitations of the prior art by generating a beam with substantially orthogonally polarized components, splitting the beam to separate the components to separate paths, projecting each component into a respective polarization preserving optical fiber (PPF), recombining the components output from the fibers into a single beam, and transmitting the single beam to an interferometer. The PPFs may be rotationally adjusted at their output ends to provide precise orthogonality in the resulting beam.

DETAILED DESCRIPTION OF A PREFERRED EMBODIMENT

Figure 1:
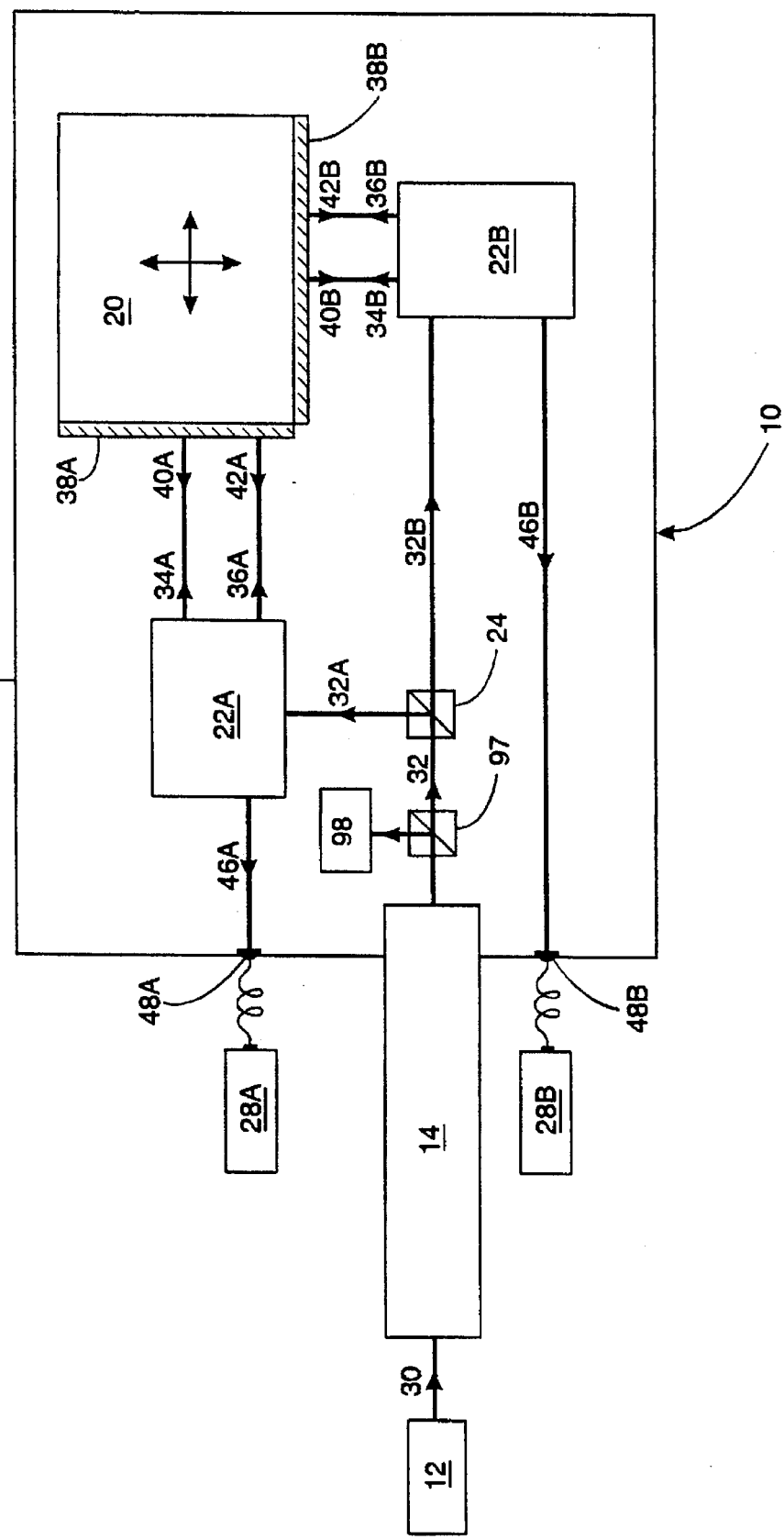
FIG. 1 is a schematic view of a preferred embodiment of the invention as applied with an interferometer system.

FIG. 1 illustrates an interferometer system 10 including a light source 12 and a novel beam processor 14 that will be discussed in detail below with respect to FIG. 2. The system 10 includes a chamber 18 that contains an X-Y stage or target 20, a pair of plane mirror interferometers 22A and 22B, and a beam splitter 24. A pair of receivers 28A and 28B are positioned outside the chamber, as is the light source 12 and a major portion of the beam processor 14.

The interferometer system 10 operates by reflecting a laser beam having orthogonally polarized components of slightly different frequencies off the target and a fixed reference mirror, and analyzing the reflected light components as the target moves, thus accurately determining target displacement. The light source 12 produces an initial beam 30 that is approximately orthogonally polarized. The beam processor 14 receives the initial beam outside the chamber, corrects the orthogonality of the initial beam, and transmits it into the chamber. The resulting beam 32 encounters the conventional beam splitter 24, which reflects beam 32A to interferometer 22A and transmits beam 32B to interferometer 22B.

Interferometer 22A sends beams 34A and 36A to reflect off a mirror 38A mounted to the target 20, which returns beams 40A and 42A to the interferometer 22A. After internal optical combining and processing, the interferometer 22A sends an optical signal beam 46A to a fiber optic coupler 48A, which sends the signal to processor 28A for computation and display of displacement information. While interferometer 22A measures displacement along the X axis, interferometer 22B similarly measures Y axis displacement.

To avoid the nonlinearity errors that arise due to lack of complete separation of the beam components, the beam processor 14 corrects the non orthogonality of the initial beam 30 to within 10 arc seconds of 90°. This reduces nonlinearity error by several orders of magnitude compared with an uncorrected beam having a typical orthogonality tolerance of ±1°. Conventional systems have nonlinearity errors due to non orthogonality of about 1.0 to 2.0 nm; the present invention reduces this error to about 0.001 nm.

Figure 2:
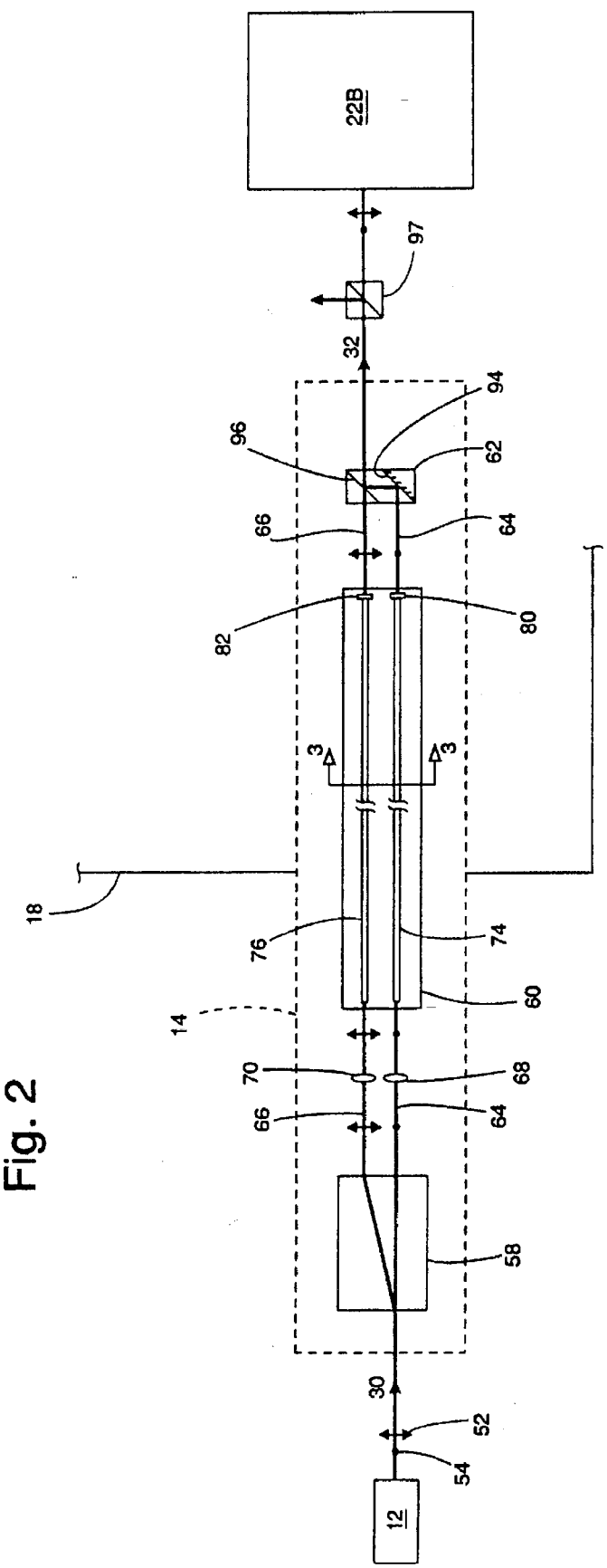
FIG. 2 is an enlarged schematic view of the illumination system of FIG. 1.

As shown in FIG. 2, the initial beam 30 emitted by the laser 12 is roughly orthogonally polarized, as indicated by arrow 52 showing polarization in the plane of the page, and dot 54 showing polarization perpendicular to the plane of the page.

The beam processor 14 includes a birefringent beam splitter prism 58, a polarization preserving fiber (PPF) assembly 60, and a beam combiner 62. The prism 58 has different indices of refraction in different axes, so that the beam is separated into first and second components 64 and 66 of approximately orthogonal polarization. The beam components 64, 66 encounter respective fiber optic couplers 68 and 70, which guide the beam components into respective polarization preserving fibers 74 and 76. Each PPF terminates at a respective rotatable chuck 80, 82. Rotation of one or both chucks permits the orthogonality to be precisely adjusted. The PPFs may be flexible and of any length to accommodate usage in a variety of environments. The PPF assembly 60 may include insulation and thermal control apparatus to maintain the fibers at a constant temperature, thereby avoiding introduction of long term errors due to changes in refractive index.

Figure 3:
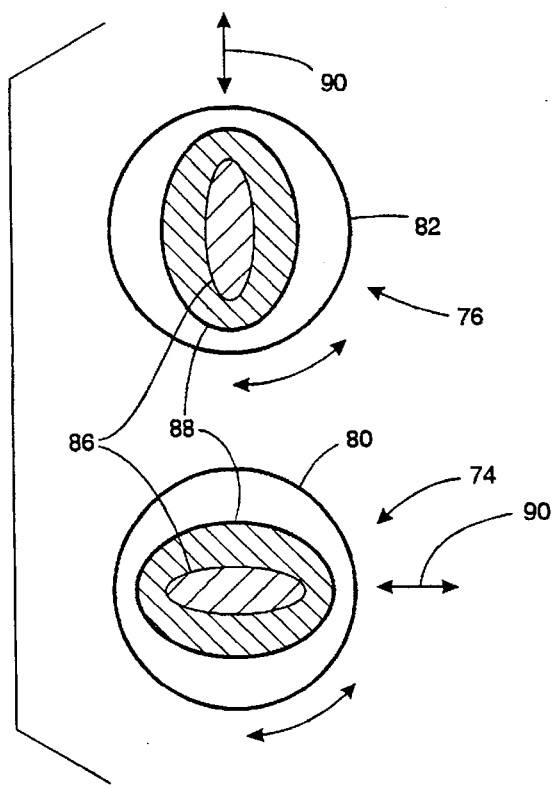
FIG. 3 is an enlarged cross sectional view taken along line 3—3 of FIG. 2.

As shown in FIG. 3, each PPF has a core 86 surrounded by cladding 88. In a polarization preserving fiber (PPF), the core is linearly birefringent. Thus, its refractive index distributions in the two principle directions are different. The birefringence is generally achieved through form asymmetry, i.e., by non circularity of the core, or by induced asymmetric stress over the core. In both cases, the birefringence is large enough that polarized light launched with its E vector parallel to one of the principle directions will continue to propagate in that state with minimum loss and the output vector will retain that direction.

Alternatively, polarizing fibers may be used instead of PPFs in the beam processor 14. In a polarizing fiber, one of the orthogonal modes is made lossy. Consequently, light launched into the low loss mode will continue in that mode to the end of the fiber. Any light coupled into the orthogonal or high loss mode is rapidly attenuated, thus keeping the output linearly polarized. For the purposes of this disclosure, polarizing fibers may be considered within the general class of PPFs.

Referring back to FIG. 2, the beam combiner 62 is a prism that includes a mirror 94, and a polarizing beam splitter 96. Beam component 66 is effectively transmitted by the beam splitter, and the orthogonally polarized component 64 is reflected laterally by the mirror 94 toward the beam splitter, which largely reflects component 64. The combined beam components follow a common path as resulting beam 32, which proceeds toward interferometer 22B and other components as shown in FIG. 1. For simplicity, some system components shown on FIG. 1 are omitted from FIG. 2.

As shown in FIGS. 1 and 2, a small portion of beam 32 is directed by a beam splitter 97 toward a reference detector 98. The reference detector monitors any path length error that may occur in the beam processor due to temperature fluctuations. The out put of processors 28A and 28B are used in conjunction with the output of the reference detector to precisely determine the displacement of the target.

Figure 4:
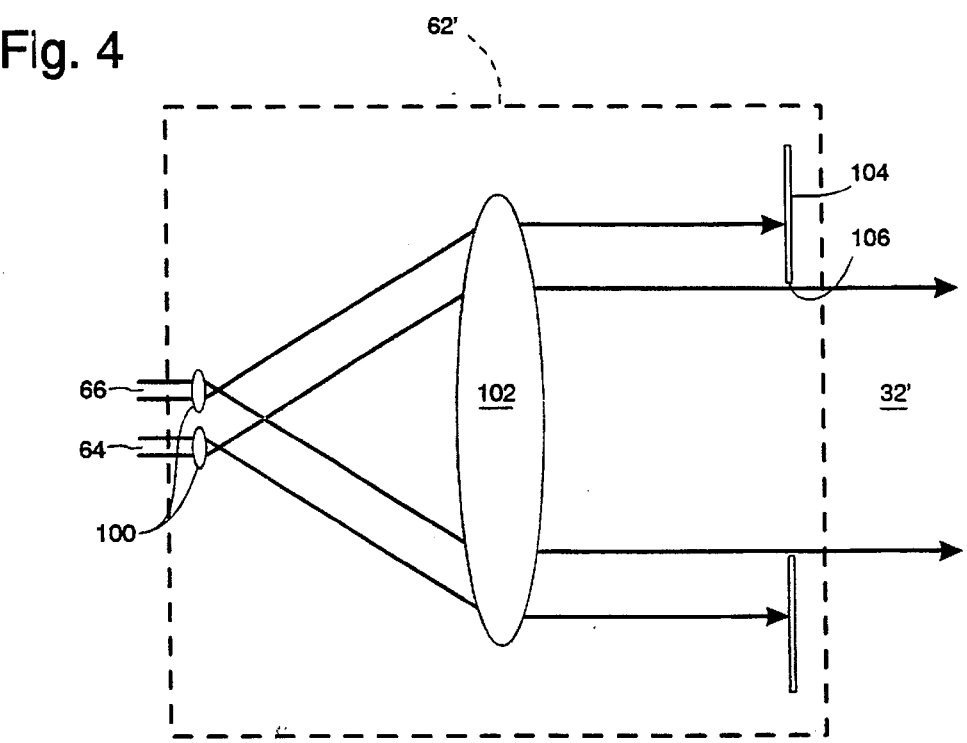
FIG. 4 is an enlarged schematic view illustrating an alternative embodiment of the invention.

FIG. 4 shows an alternate beam combiner 62' that employs a "fly's eye" principle. A pair of short focal length lenslets 100, each intercepting a respective one of the beam components 64, 66 and spreading it to substantially illuminate a condenser lens 102, which collimates the beams. A baffle 104 defining an aperture 106 transmits a resulting beam 32'.

In the preferred embodiment, The light source is a two-frequency He-Ne laser emitting at 632.8 nm and frequency shined by 2 to 20 MHz. The beam splitter 58 is a birefringent calcite prism such as 03 PPD 001/301, available from Melles Griot of Irvine, Calif. The PPF assembly 60 is model F-SPV, from Newport Klinger of Irvine, Calif. The chucks 82 are model 561-FH/GON, from Newport Klinger of Irvine, Calif. Interferometers 22A and 22B are any of the HP 10700 series, from Hewlett-Packard Company of Palo Alto, Calif. Receivers 28A and 28B are model HP 10780C/F.

Although the preferred embodiment is shown having two rotatable PPFs, an alternative embodiment employing the same principles may include only a single PPF, with one beam component providing a polarization frame of reference, and the other component being rotatable to provide precise orthogonality. In addition the initial birefringent prism may be replaced with a polarizing beam splitter and mirror unit similar to beam combiner 62. Also, the beam combiner 62 may be eliminated in applications using an interferometer that accepts separate beams, or which includes a beam combiner. While the disclosure is described in terms of preferred and alternative embodiments, the invention in not intended to be so limited.

I claim:

1. A method of providing illumination to an interferometer including the steps:

generating an initial beam having a first beam component and a second beam component;

splitting the initial beam to separate the first and second components into spatially separate first and second paths;

positioning in the first path a first flexible polarization preserving fiber having an inlet end and an outlet end;

positioning in the second path a second flexible polarization preserving fiber having an inlet end and an outlet end;

projecting the first beam component into the inlet end of the first fiber;

transmitting the first beam component through the first fiber;

projecting the second beam component into the inlet end of the second fiber;

transmitting the second beam component through the second fiber;

emitting the first beam component from the outlet end of the first fiber, the emitted first beam component having a first polarization;

emitting the second beam component from the outlet end of the second fiber, the emitted first component having a second polarization orthogonal to the first polarization;

calibrating the relative polarization of the first and second beam components by rotating the outlet end of at least one of the fibers; and recombining the first and second components into a single resulting beam for transmission to an interferometer.

2. The method of claim 1 including the step of calibrating the orthogonality of resulting beam by rotating the outlet end of at least one of the fibers.

3. The method of claim 2 including maintaining the inlet ends of the fibers in a fixed position while rotating the outlet end of at least one of the fibers.

4. The method of claim 1 including the step of calibrating the polarization and orthogonality of resulting beam by rotating the outlet ends of both fibers.

5. The method of claim 1 wherein generating an initial beam having first and second components includes generating a first component having a first polarization and generating a second beam component having a substantially orthogonal second polarization, such that the beam components are polarized before they enter the polarization preserving fibers.

6. An orthogonality-corrected beam source for an interferometer comprising:

a light source generating an initial beam having a first beam component and a second beam component;

a beam splitter positioned to intercept the initial beam and output a pair of spatially separate first and second beams;

a pair of first and second flexible polarization preserving optical fibers, each having an inlet end positioned to intercept a respective one of the first and second beams, and an outlet end emitting the respective beam, the outlet end of at least one of the fibers being rotationally adjustable such that polarized beams output by the fibers are polarized at a selected angle with respect to each other;

first projection means positioned on a light path between the light source and the inlet end of the first fiber for projecting the first beam component into the inlet end of the first fiber;

second projection means positioned on a light path between the light source and the inlet end of the second fiber for projecting the second beam component into the inlet end of the second fiber; and beam combining means for recombining the first and second beams emitted by the fibers into a single beam, and for transmitting the single beam to the interferometer.

7. The apparatus of claim 6 wherein the fibers are birefringent fibers.

8. The apparatus of claim 6 including an interferometer and target under measurement both positioned within an enclosure, and the light source is positioned outside the enclosure.

9. The apparatus of claim 8 wherein the target is mounted on an X-Y stage that includes at least two mirrors for reflecting the beam components to the interferometer.

10. The apparatus of claim 6 wherein the light source is a laser generating a beam including substantially orthogonally polarized first and second beam components.

11. The apparatus of claim 10 wherein the beam components have different frequencies.

12. The apparatus of claim 6 wherein the beam combiner includes fly's eye lenses.

13. The apparatus of claim 6 wherein the beam combiner includes a reflective element that transmits light of one polarization and reflects light of orthogonal polarization.

14. The apparatus of claim 6 wherein at least one of the fibers includes an adjustable chuck at its output end, the chuck being rotatable to precise angular displacements.

15. A method of providing illumination to an interferometer including the steps:

generating an initial beam having a first beam component and a second beam component, the first and second beam components having substantially orthogonal polarization directions;

splitting the initial beam to separate the first and second components into spatially separate first and second paths;

positioning in the first path a first polarization preserving fiber having an inlet end and an outlet end;

projecting the first beam component into the inlet end of the first fiber;

recombining the first and second components into a single resulting beam for transmission to an interferometer; and calibrating the polarization direction of the first component relative to the polarization direction of the second component by rotating the outlet end of the first fiber.

16. The method of claim 15 including the steps:

positioning in the second path a second polarization preserving fiber having an inlet end and an outlet end; and projecting the second beam component into the inlet end of the second fiber.

17. The method of claim 16 including the step of rotating the outlet end of the second fiber.

18. The method of claim 15 including the step of recombining the first and second components into a single resulting beam for transmission to an interferometer.

* * * * *